United States Patent [19]
Bandy et al.

[11] Patent Number: 5,150,735
[45] Date of Patent: Sep. 29, 1992

[54] CONTAINMENT VALVE THAT ALLOWS CONTAMINATION FREE TRANSFER

[75] Inventors: Michael J. Bandy, Greenwood; Roy H. Byerly; Robert T. Spoonmore, both of Indianapolis, all of Ind.

[73] Assignee: Eli Lilly and Company, Indianapolis, Ind.

[21] Appl. No.: 827,357

[22] Filed: Jan. 29, 1992

[51] Int. Cl.⁵ .............................................. F16L 37/28
[52] U.S. Cl. .................................. 137/614.06; 137/614
[58] Field of Search .............. 137/614, 614.01, 614.06; 251/305

[56] References Cited

U.S. PATENT DOCUMENTS

| | | | |
|---|---|---|---|
| 2,426,471 | 8/1947 | Snyder | 137/614.06 |
| 3,159,180 | 12/1964 | Courtot et al. | 137/614.06 |
| 4,515,182 | 5/1985 | LeDevehat | 137/614.06 |

FOREIGN PATENT DOCUMENTS

| | | |
|---|---|---|
| 8705947 | 5/1989 | Brazil . |
| 905149 | 2/1982 | U.S.S.R. . |

OTHER PUBLICATIONS

*Muller Drums with Know-How and Service* Booklet "1.6.85".
ARAC Project I-7280, Search and Edit Results, Mar. 1985.
*Sterile-Sealt Valves*, Garlock Valves and Industrial Plastics Booklet, date unknown.
Spectrum Processor, Brochure, date unknown.
Victaulic Brochure, Aug. 1, 1991.
Counter Lock'n Load Brochure, 1990.
Article entitled "Vacuum Transfer/Sieving for Powder Handling", D&CI, Mar., 1985 (McIntire).

*Primary Examiner*—A. Michael Chambers
*Attorney, Agent, or Firm*—Woodard, Emhardt, Naughton, Moriarty & McNett

[57] ABSTRACT

A containment valve with two butterfly valves at the juncture of a first port and a second port with the two valves pivoting on a common transverse axis. The ports may be coupled and uncoupled between a coupled mode and an uncoupled mode. In the uncoupled mode one butterfly valve body locks the first port shut and the other butterfly valve body locks the second port shut to isolate the contents of the ports, such as chemical dust. Each butterfly valve body has a circumferentially moveable annular locking ring moveable between a first position and a second position. In one position the locking ring locks the butterfly valve body shut when the ports are in an uncoupled mode. In the other position the locking rings hold the two ports in the coupled mode. A spring biased pin lock prevents inadvertent rotation of the annular locking ring.

23 Claims, 6 Drawing Sheets

CONTAINMENT VALVE THAT ALLOWS CONTAMINATION FREE TRANSFER

BACKGROUND OF THE INVENTION

The present invention relates generally to valves, and more specifically relates to butterfly valves which may be coupled and uncoupled without exposing the content of the valves to the outside environment.

Valves are used in material handling such as to regulate the flow of powder in conduits and in and out of containment vessels. In certain applications, it is important to isolate the material from the outside environment. For example, in chemical industries and pharamaceutical industries it may be necessary to isolate a material from the environment to maintain the purity and sterility of the material, to protect the outside environment from toxic or other harmful effects of the material, or both. However, some applications require not only regulation of flow through the valve, but also the ability to separate the conduit and/or containment vessel while maintaining the integrity of the system. This may be especially desirable where chemicals being handled are granular or in the form of a powder.

One prior device is disclosed in Soviet Inventor's Certificate No. 905,149 which shows two spring-biased elliptically shaped butterfly valves which are forced open upon coupling of two conduits. Another device is shown in Brazilian Patent No. PI 8705947A which discloses a three-stage valve used in powder transfer.

The present invention provides advantages over these prior devices while maintaining a relatively simple design which is interchangeable with corresponding valve halves, and is readily cleaned and sterilized and assembled by the operator.

SUMMARY OF THE INVENTION

The present invention provides a valve system for between a first container port and a second container port, comprising:
a first butterfly valve body pivotable about an axis which is oriented transverse to the first port and a second butterfly valve body pivotable about the transverse axis. The first port and the second port are uncoupleable and coupleable with respect to each other between an uncoupled mode and a coupled mode respectively, wherein the butterfly valve bodies are simultaneously pivotable about the transverse axis to an open position to allow flow of material through the first and second ports. A first locking member is provided which is rotatable circumferentially with respect to the first port from a first circumferential position to a second circumferential position, wherein in the first circumferential position the first locking member locks the first butterfly valve body in a closed position, and wherein in the second circumferential position the first locking member unlocks the first butterfly valve body to allow pivoting of the first butterfly valve body to the open position.

The present invention further provides a valve system in which butterfly valve bodies and corresponding locking members are interchangeable.

One object of the present invention is to provide a containment valve that allows dust free powder transfer.

Another object of the present invention is to provide a valve system which, when separated maintains a vessel in a separate container completely sealed with all exposed surfaces of the valve cleaned before and after connection.

Another object of the present invention is to provide a valve which is accident proof from opening when the system is separated and a valve which provides dust free powder transfer without obstructing the line of powder flow when the system is together.

Another object is to provide a valve system in which the valve pieces are completely cleanable and sterilizable and in which valve halves are identical and fit together interchangeably.

Another object is to provide the foregoing advantages with a valve which does not require a person to reach into a line of powder flow for valve operation and which allows valve operation in either direction so a container can be loaded or unloaded through the same valve.

These and other advantages of the present invention will be apparent from the written description and drawings herein.

DESCRIPTION OF THE PREFERRED EMBODIMENT

Figure 1:
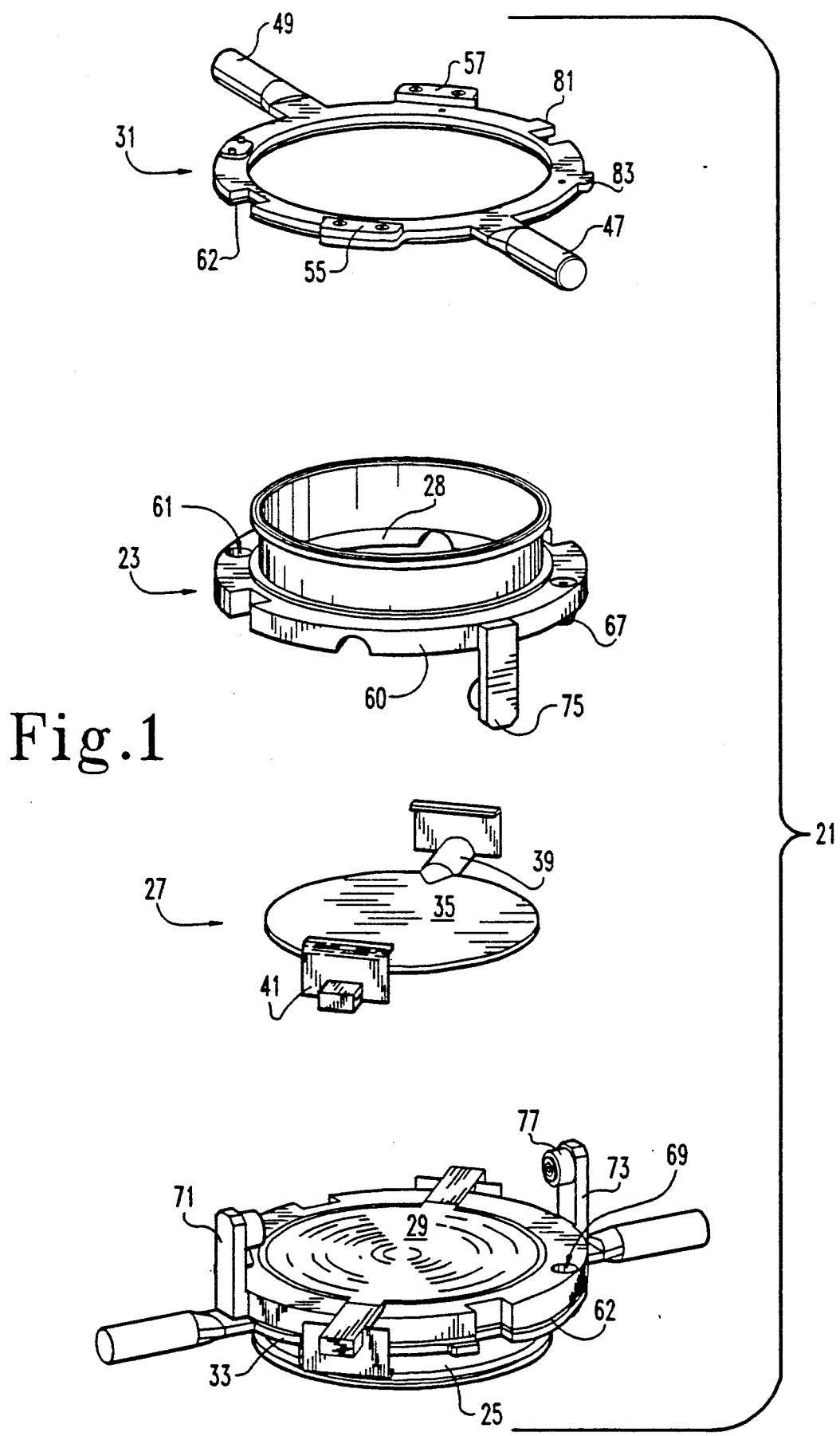
FIG. 1 is a perspective view of one embodiment of the present invention showing one-half of the assembly exploded.
Figure 2:
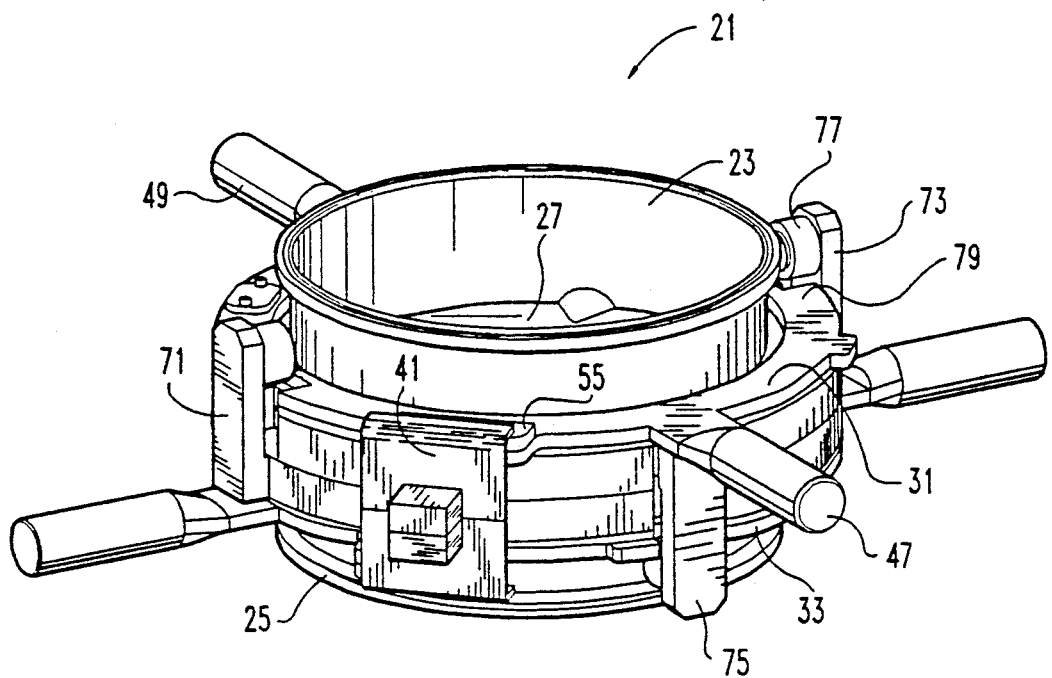
FIG. 2 is a perspective view of the device of FIG. 1 assembled mode and with the butterfly valve bodies closed.
Figure 3:
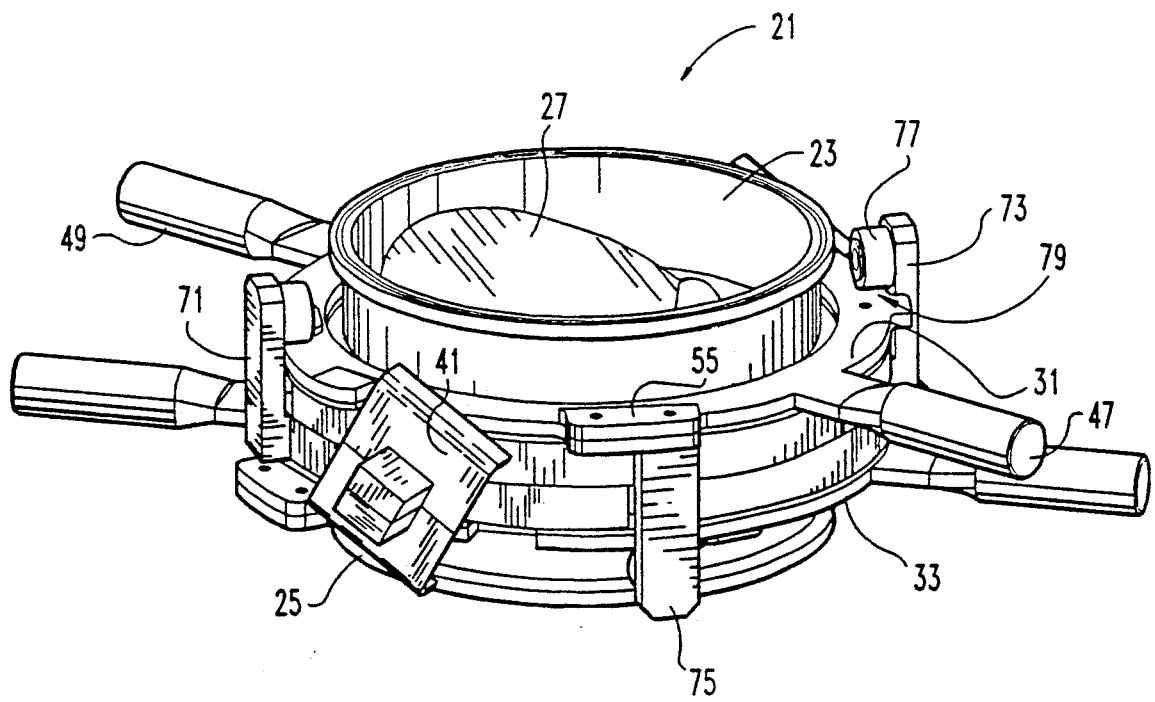
FIG. 3 is a perspective view of the device of FIG. 1 fully assembled in a coupled mode and with the butterfly valve bodies open.
Figure 4:
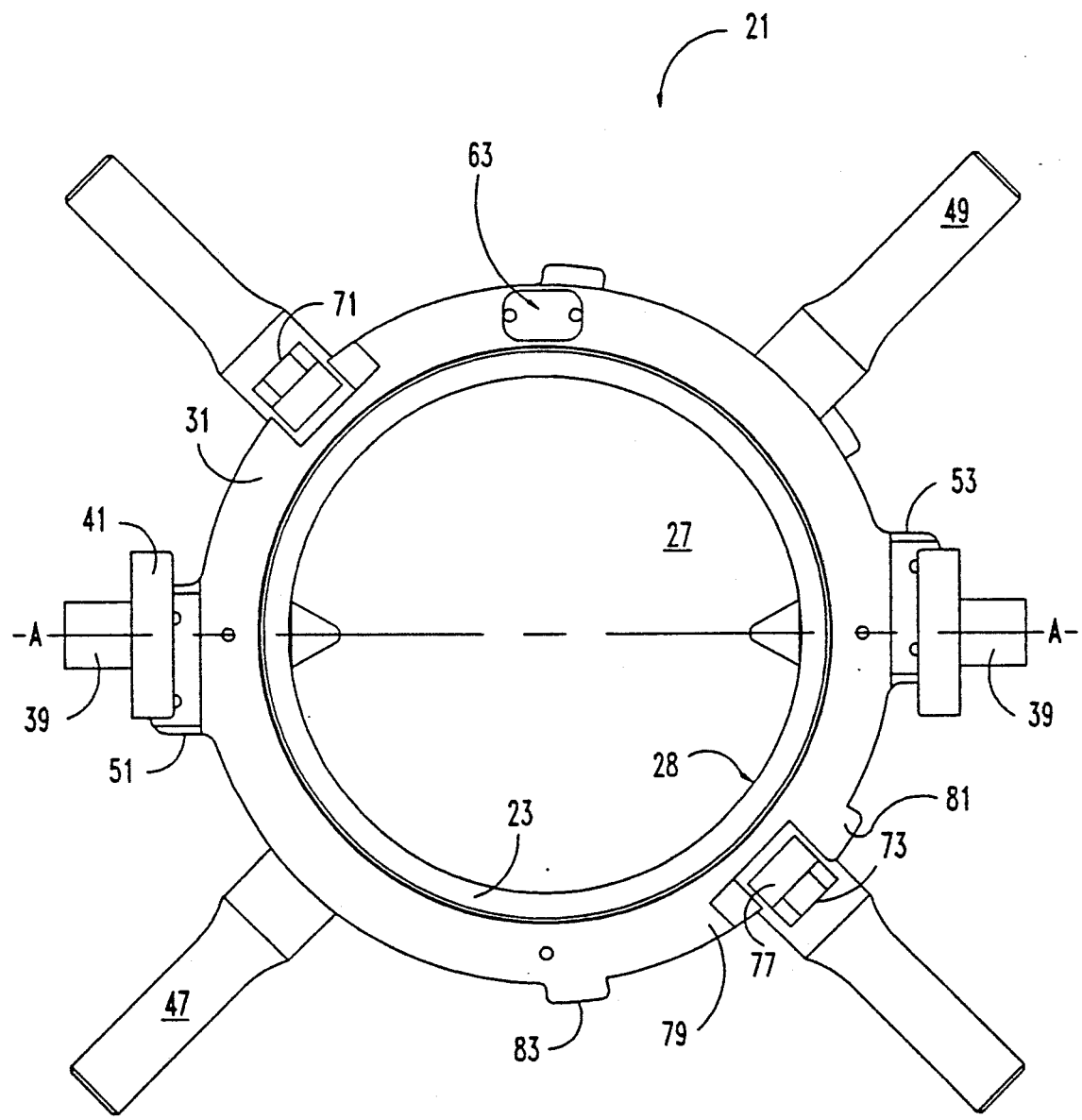
FIG. 4 is a top plan view of the device illustrated in FIG. 2.
Figure 5:
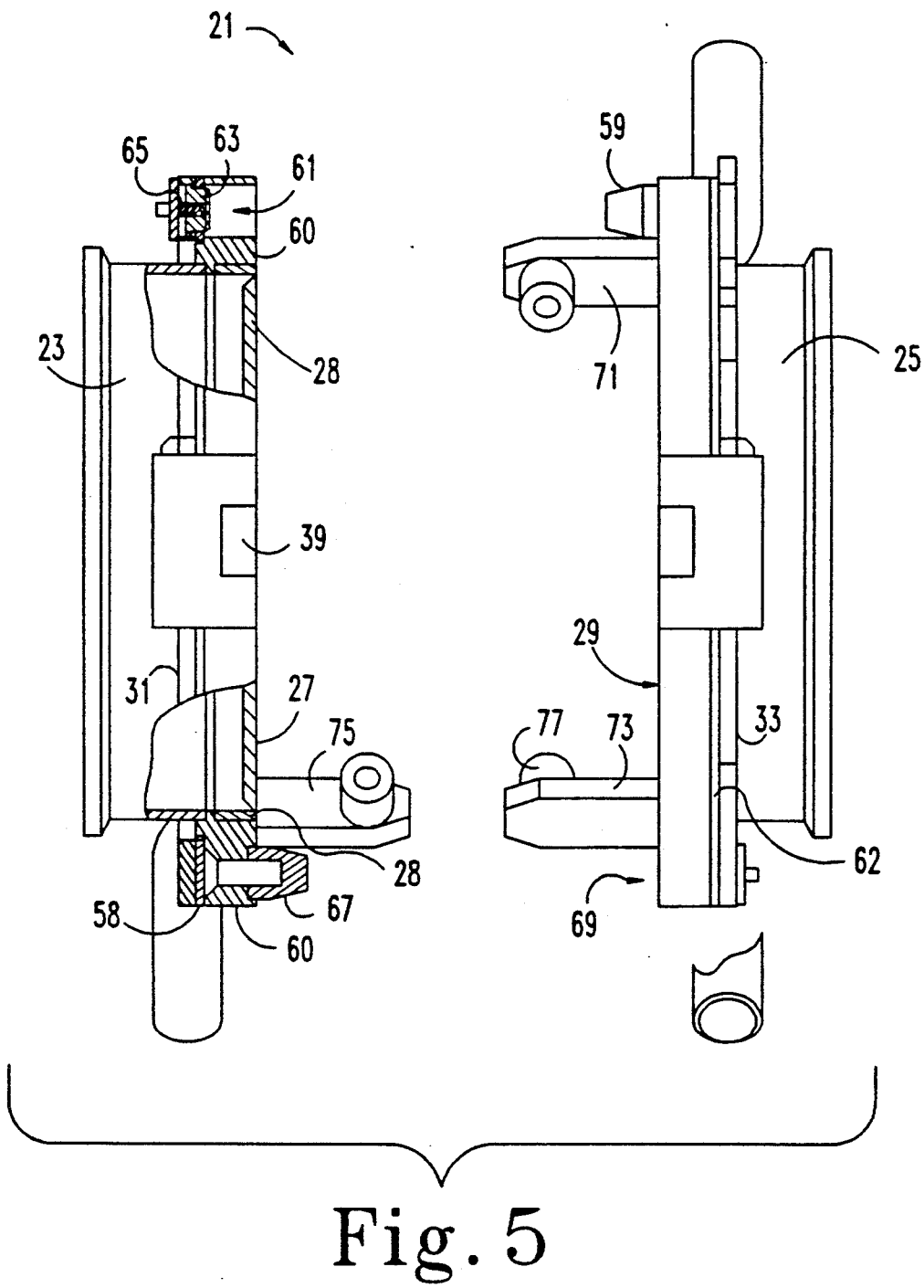
FIG. 5 is a side view of the first embodiment of the present invention shown in an uncoupled mode and partially cut away.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Generally, the invention shown has two container ports 23 and 25 which may be coupled together, and are held together by two pairs of prongs. A butterfly valve opens and closes between the two ports and consists of two halves, valve body 27 and valve body 29. When the container ports are uncoupled, the respective valve bodies separate, keeping each of the two ports sealed closed. Two locking members 31 and 33 lock and unlock the butterfly valve and help couple the two ports together.

Referring to FIGS. 1-10, a single example of the present invention is illustrated as valve system 21. In this embodiment, there are six major components: first container port 23, second container port 25, first butterfly valve body 27, second butterfly valve body 29, first locking member 31 and second locking member 33. As illustrated, the container ports are essentially identical to each other, the butterfly valve bodies are essentially identical to each other and the locking members are essentially identical to each other, resulting in two identical three-part subassemblies (see FIGS. 1 and 5) of the overall valve system 21.

Container ports 23 and 25 in use are attached to any one of a variety of conduits, containers, vessels or other chambers in which material to be handled is kept. The invention has particular application with respect to handling and transferring solid materials, such as toxic, sterile and/or corrosive solids, including powders and dusts. However, the present invention has applicability with other solids such as crystals, particulates, granulars and/or tablets useful in the pharmaceutical industry or other industries and may also be used in handling liquids or gases. A key attribute of the present invention is that it allows container port 23 and container port 25 to be separated from one another in an uncoupled mode (see FIG. 5) while maintaining the powder or other material inside the respective container ports, sealed from the outside environment. Conversely, when container port 23 and container port 25 are held together in a coupled mode, the two butterfly valve bodies 27 and 29 pivot together with valve system 21 acting as a valve between container port 23 and container port 25. As illustrated, the container ports include an outer wall defining an inner conduit volume through which the material being handled passes.

Locking member 31 and locking member 33 preferably are annular rings disposed externally around the circumference of container port 23 and container port 25 respectively. The locking members are moveable, preferably through circumferential rotation, with respect to the container ports between a first position and a second position for locking and unlocking the butterfly valve bodies. The locking members act to lock each of their respective butterfly valve bodies closed when system 21 is in an uncoupled mode (FIG. 5) but unlocks them and allows them to pivot about axis A when the container ports are in a coupled mode (e.g. FIG. 3).

Figure 8:
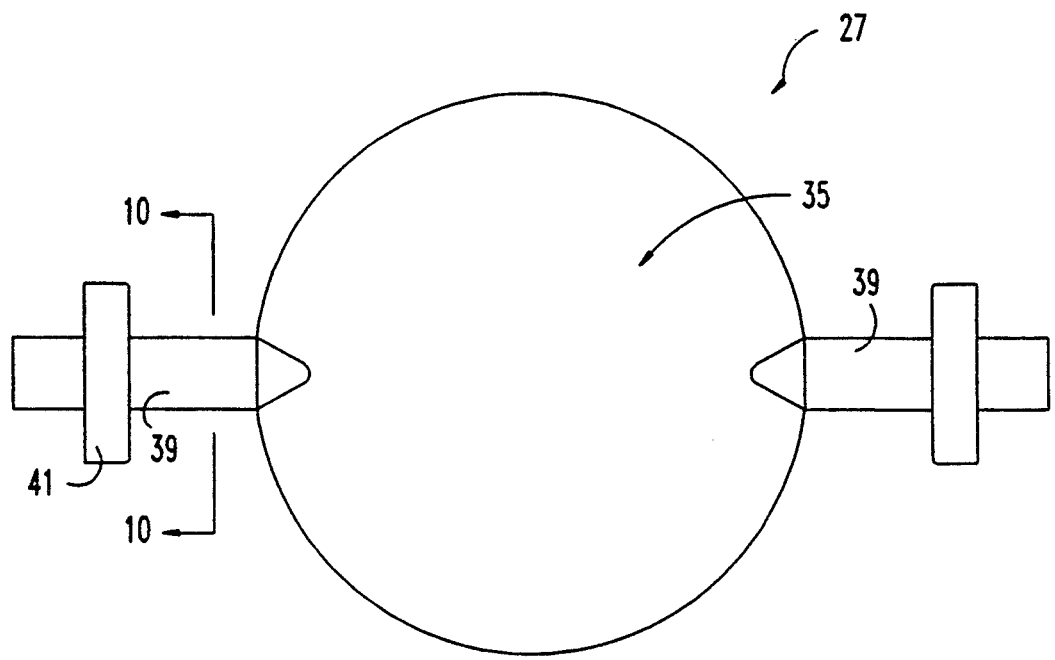
FIG. 8 is a top plan view of one butterfly valve body of the device of FIG. 1 shown in isolation.
Figure 9:
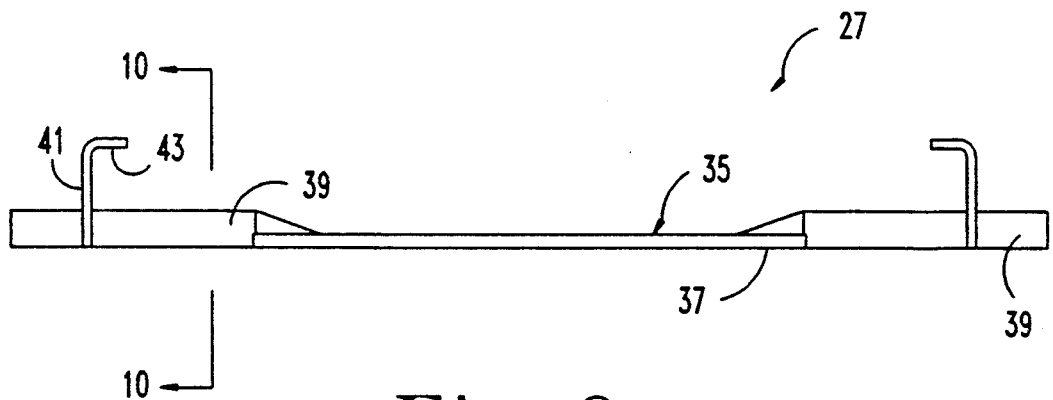
FIG. 9 is a side view of the butterfly valve body of FIG. 8.
Figure 10:
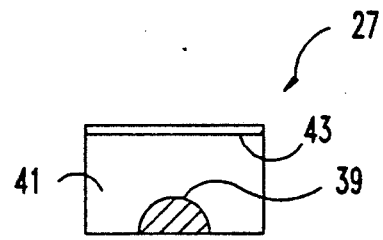
FIG. 10 is a cross-sectional detail taken along lines 10—10 of FIGS. 8 and 9.

FIGS. 8-10 illustrate a typical butterfly valve body, such as valve body 27, in isolation. The valve body includes a generally planar section 35 having a generally planar face 37 on the inside thereof which will mate with a corresponding generally planar face of valve body 29. Note that in the preferred embodiment the middle region of face 37 is ground slightly concave leaving a slight gap between the planar sections of the valve bodies to enhance the tight-fitting perimeter seal between valve body 27 and valve body 29 to prevent dust or other contaminants from getting on face 37 so that it is essentially free from powder from container ports 23 and 25. Planar section 35 is secured to pivot shaft 39 which, as illustrated, is hemicylindrical to mate with a corresponding hemicylindrical pivot shaft of adjacent butterfly valve body 29 to form a cylindrical pivot shaft which is rotatable between the container ports. A pair of handles, such as handle 41, are secured to pivot shaft 39. Handle 41 serves a dual function in the preferred embodiment. The first function is to provide a convenient handle to grasp and pivot the butterfly valve bodies. The second function is to provide locking engagement with a radially projecting locking tab (discussed below) of the corresponding locking member 31. Specifically, in this embodiment locking is provided by having the locking member engage locking surface 43 (see FIGS. 9 and 10) on the bottom surfaces of the horizontal flange of handle 41. Similar locking surfaces are provided on both handles of each butterfly valve body. An elastomeric ring, such as elastomeric ring 28 (see FIG. 5), lines the inner wall of port 23 to provide a snug seal with butterfly valve body 27. A similar seal is provided between valve body 29 and port 25.

Figure 6:
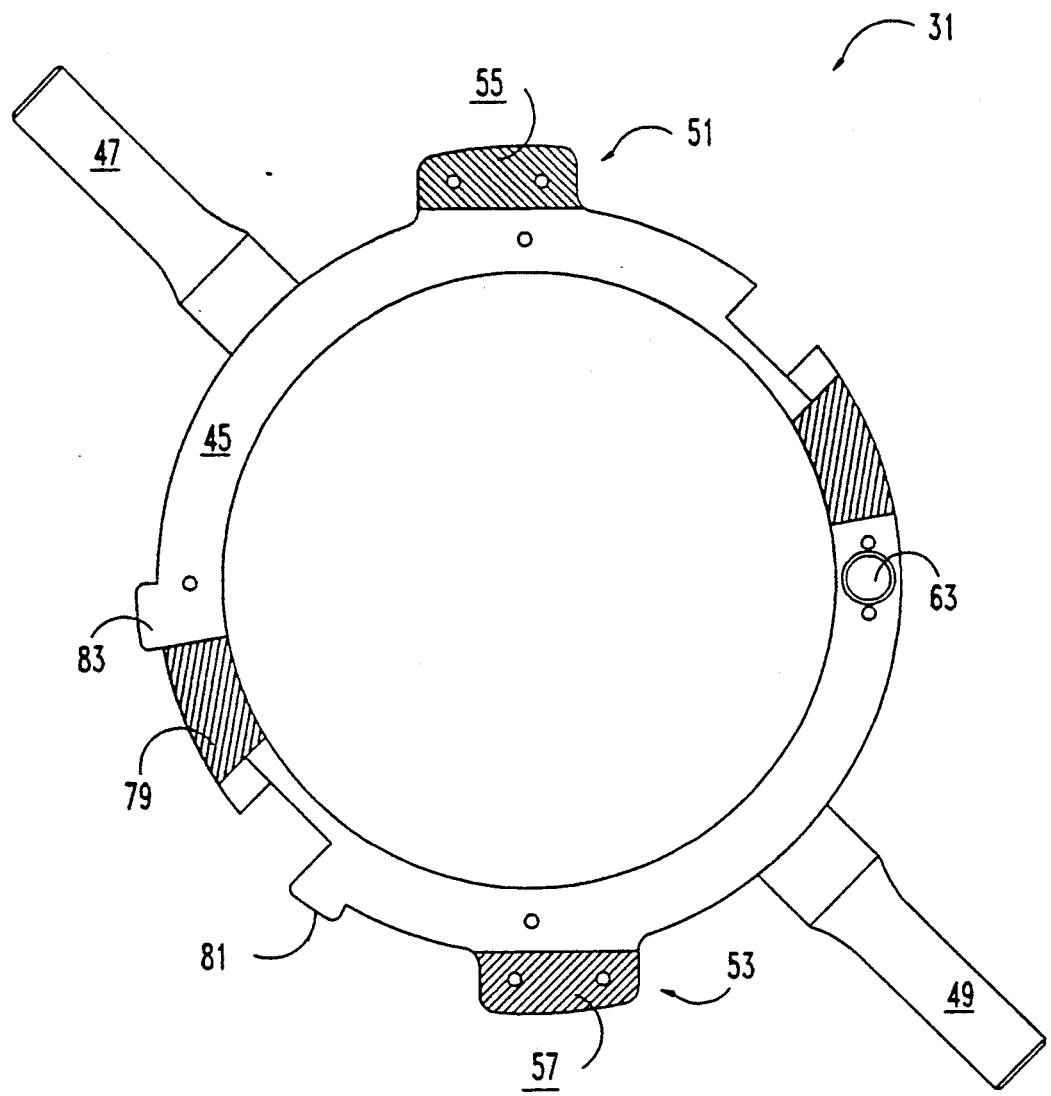
FIG. 6 is a top plan view of one locking member of the device of FIG. 1 shown in isolation.
Figure 7:
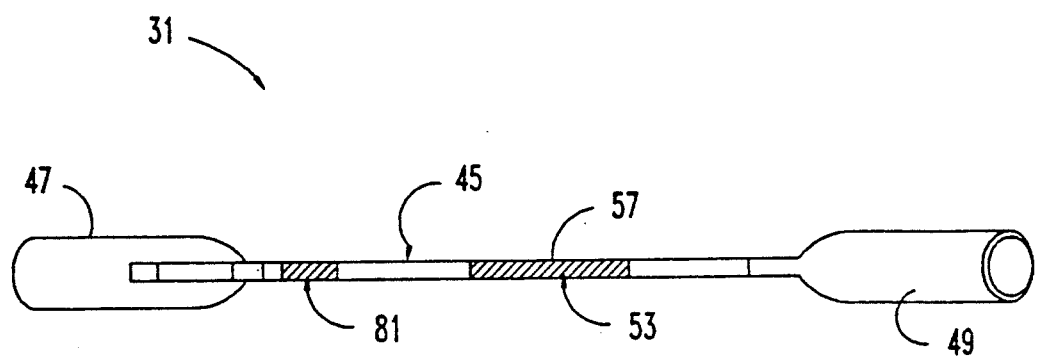
FIG. 7 is a side view of the locking member of FIG. 6.

Referring to FIGS. 6 and 7, locking member 31 is illustrated including annular ring member 45 with two radially projecting handles 47 and 49. A pair of radially projecting tabs 51 and 53 are provided on ring 45 defining locking surface 55 and locking surface 57 respectively. These locking surfaces engage the locking surfaces, such as locking surface 43, on the butterfly valve bodies as illustrated in FIGS. 8-10. In the preferred embodiment, locking surfaces 55 and 57 are made of a softer material than the metal used on surface 43 to prevent galling, it having been found that Delrin brand plastic (offered by Du Pont) is suitable for these surfaces. Similarly, to prevent galling a ring of softer material (e.g. Delrin brand plastic) 58 is provided between locking member 31 and the radial flange 60 (see FIGS. 1 and 5) of port 23. A similar ring of bushing material 62 is provided between locking member 33 and port 25. In operation of valve system 21, when the locking member is rotated circumferentially by applying circumferential force on handles 47 and 49 to slide the locking surfaces together, such as surface 55 in contact with surface 43, pivoting of the butterfly valve bodies about axis A is prevented (see FIGS. 2 and 4). In this locked mode, the two container ports may be separated without having butterfly valve body 27 or 29 inadvertently opening and thereby exposing the contents of material inside the container ports.

Furthermore, in this locked, uncoupled mode the locking members, such as locking member 31, are prevented from inadvertently rotating to an unlocked position by the operation of a spring biased pin and recess arrangement. More specifically, referring to FIG. 5 an axially projecting pin 59 is secured to container port 25 whereas a corresponding recess 61 is provided in container port 23 for receiving pin 59. Inside of recess 61 is a spring biased pin 63 urged into recess 61 by spring 65. Reciprocating pin 63 and spring 65 are mounted to first locking member 31 on its annular ring portion. When valve system 21 is in its locked, uncoupled mode spring 65 urges pin 63 into recess 61, thereby locking container port 23 and locking member 31 against movement circumferentially with respect to each other. However, when the two subassemblies of valve system 21 are placed together in a coupled mode, mating pin 59 contacts pin 63 and urges it out of recess 61, thereby allowing rotation of locking member 31 with respect to container port 23. Furthermore, mating pin 59 and recess 61 provide for proper alignment of the two halves of valve system 21 when being coupled. There is an inverse and hermaphroditic mating pin 67 and recess 69 in container port 23 and container port 25 respectively as illustrated, functioning essentially the same as mating pin 59 and recess 61, with a spring bias pin identical to pin 63 in recess 69 so as to prevent and to allow rotation of locking member 33 with respect to container port 25.

Radially projecting stop 81 contacts prong 73 (see FIG. 4) to prevent over-rotation of locking member 31 in the locked, uncoupled mode. Conversely, stop 83 prevents over-rotation by contacting prong 73 when moving the locking member into the unlocked, coupled mode. Identical stops are provided on locking member 33.

The two subassemblies of container port 23 and of container port 25 are coupled together by the interaction of four locking prongs with the two locking members 31 and 33. Three of the four locking prongs are illustrated as prongs 71, 73 and 75. The fourth prong, which is secured to container port 23, is not illustrated due to the cutaway drawing configuration in FIG. 5, but is located diametrically across from prong 75 similar to the relationship between prongs 71 and 73. In the preferred embodiment, each of the prongs have locking member surfaces in the form of rollers. Prong 73 is typical, having roller 77 thereon. Alternately, the prongs may provide bayonet mounting through slots, holding the ports together (not shown). Similar to surfaces 55 and 57, preferably the rollers are made of a softer material, such as plastic, to prevent galling when brought in engaging contact with the respective locking member. When container port 23 and container port 25 are in a coupled mode, roller 77 acts as a locking surface and is rolled into engagement with locking surface 79 which, in the preferred embodiment, is on annular ring member 45 of the first locking member 31. This engagement is caused by circumferentially rotation of locking member 31 so the system is in the coupled mode. This surface is slightly ramped to facilitate receiving of the roller as the locking member is rotated. In the coupled mode, the remaining three rollers likewise engage similar locking surfaces on the locking members. The invention works best if tolerances are held to within 0.001 inches, particularly on the critical locking surfaces and faces between moving parts.

Furthermore, in the unlocked mode (see FIG. 3) the locking tabs 51 and 53 are no longer in engagement with the handles and locking surface (e.g. locking surface 43) of the butterfly valve bodies, thereby allowing them to pivot about axis A. Accordingly, the present invention provides a locking system which is mutually exclusive between two modes, a coupled mode in which the butterfly valves are free to pivot so as to open and close the valve, and an uncoupled mode in which the respective halves of the butterfly valve are locked in a closed position so as to maintain containment integrity of the system. It is significant that in this configuration in the coupled mode the valve body collectively defined by valve bodies 27 and 29 may be completely pivoted in excess of 180° and even in excess of 360° inside the container ports. This is useful in that there may be times when closing of the butterfly valve may be obstructed by a localized piece of the material in the valve when the valve is rotated in one direction, but that by rotating the valve in an opposite direction the operator may avoid or break up the obstruction and close the valve. As stated before, it is preferable that the respective halves of the valve system are interchangeable and preferably hermaphroditic with one another. In this way, when the various component parts are disassembled, which may readily be done with the present invention for cleaning and/or sterilizing, their reassembly may be done universally without the risk of error in combining improper components. Furthermore, this feature provides versatility in that it facilitates material handling between various vessels. For example, if there are three vessels, vessel A, vessel B and vessel C, each having a corresponding half of valve system 21 including a first container port and a first butterfly valve body, due to their interchangeable and hermaphroditic structure they may be freely connected with one another. In other words, any of the coupling permutations may be achieved such as connecting vessels A and B, vessels A and C, and/or vessels B and C without concern of whether the appropriate valve fittings will match one another.

Another design advantage of this valve is the mating guide pins designed so as to facilitate the mating of the valve halves. The pins permit the mating of the valve halves even when slightly misaligned. This feature is critical when using the valves in an automatic mode. With the broad mating tolerance in the pins this design, robotically mating the valve is practical.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A valve system, comprising:
    a first container port and a second container port which are uncoupleable and coupleable with respect to each other between an uncoupled mode and a coupled mode respectively;
    a first butterfly valve body pivotable about an axis which is oriented transverse to the first port and the second port, wherein said first butterfly valve body in a closed position seals the first port against flow of material therethrough;
    a second butterfly valve body pivotable about said transverse axis, wherein said second butterfly valve body in a closed position seals the second port against flow of material therethrough, wherein in said coupled mode said first and second butterfly valve bodies are immediately adjacent each other and are simultaneously pivotable about said transverse axis to an open position to allow flow of material through the first and second ports;
    a first locking member which is rotatable circumferentially with respect to the first port from a first circumferential position to a second circumferential position, wherein in said first circumferential position said first locking member locks said first butterfly valve body in said closed position, and wherein in said second circumferential position said first locking member unlocks said first butterfly valve body to allow pivoting of said first butterfly valve body to said open position.

2. The valve system of claim 1 wherein said first locking member in said second circumferential position further locks the first port and the second port together in said coupled mode.

3. The valve system of claim 2 wherein said first butterfly valve body and said second butterfly valve body each have generally planar faces, wherein adjacent faces of said adjacent first butterfly valve body and second butterfly valve body are in contact with each other to provide a dust-tight seal therebetween in said coupled mode, whereby in said uncoupled mode said faces of said first and second butterfly valve bodies are exposed and are essentially free of dust from the first port and the second port.

4. The valve system of claim 3 wherein in said second circumferential position said first locking member allows selective pivoting of said first and second butterfly valve bodies between said closed position and said open position, wherein said butterfly valve bodies are pivotable in excess of 360° about said transverse axis.

5. The valve system of claim 4 wherein said first locking member includes a first locking surface, wherein in said first circumferential position of said locking member said first locking surface slides into engagement with a locking surface on said first butterfly valve body, wherein said first locking surface blocks rotation of said first butterfly valve body about said transverse axis, and wherein said first locking member has a second locking surface, wherein in said second circumferential position of said first locking member said second locking surface slides into engagement with a roller on the second container port, wherein movement of said first locking member from said second circumferential position to said first circumferential position to allow uncoupling of the first and second ports locks said first butterfly valve body into said closed position.

6. The valve system of claim 5 wherein said locking member comprises an annular ring and wherein said first locking surface is located on a locking tab projecting radially from said annular ring.

7. The valve system of claim 6 and further comprising a spring biased pin and a corresponding recess for receiving said pin located between said first locking member and the first port, wherein said pin engages said recess when said first locking member is in its first circumferential position, and wherein said pin and recess block inadvertent rotation of said first locking member out of its first circumferential position to maintain said first butterfly valve body locked in its closed position is said uncoupled mode.

8. The valve system of claim 7 and further comprising a second locking member which is rotatable circumferentially with respect to the second port from a first circumferential position to a second circumferential position, wherein in said first circumferential position said second locking member locks said second butterfly valve body in said closed position, and wherein in said second circumferential position said second locking member unlocks said second butterfly valve body to allow pivoting of said second butterfly valve body to said open position.

9. The valve system of claim 8 wherein said second locking member in said second circumferential position further locks the first port and the second port together in said coupled mode.

10. The valve system of claim 9 wherein in said uncoupled mode said first butterfly valve body, said second butterfly valve body, said first locking member, and said second locking member are disassembleable apart from each other and apart from the first port and the second port;
wherein said first butterfly valve body is interchangeable with said second butterfly valve body; and
wherein said first locking member is interchangeable with said second locking member.

11. The valve system of claim 10 and further comprising a second spring biased pin and a corresponding second recess for receiving said second pin located between said second locking member and the second port, wherein said second pin engages said second recess when said second locking member is in said first circumferential position, and wherein said second pin and second recess block inadvertent rotation of said second locking member out of its first circumferential position to maintain said second butterfly valve body locked in its closed position in said uncoupled mode;
wherein the first port has a first mating pin projecting axially forward from the first port;
wherein the second port has a second mating pin projecting axially forward from the second port;
wherein in said coupled mode said first mating pin is inserted into said second recess between the second port and said second locking member and urges said second spring biased pin out of said second recess to allow circumferential rotation of said second locking member; and,
wherein in said coupled mode said second mating pin is further inserted into said recess between the first port and said first locking member and urges said spring biased pin out of said recess to allow circumferential rotation of said first locking member.

12. The valve system of claim 1 wherein said first butterfly valve body and said second butterfly valve body each have generally planar faces, wherein adjacent faces of said adjacent first butterfly valve body and second butterfly valve body are in contact with each other to provide a dust-tight seal therebetween in said coupled mode, whereby in said uncoupled mode said faces of said first and second butterfly valve bodies are exposed and are essentially free of dust from the first port and the second port.

13. The valve system of claim 1 wherein in said second circumferential position said first locking member allows selective pivoting of said first and second butterfly valve bodies between said closed position and said open position, wherein said butterfly valve bodies are pivotable in excess of 360° about said transverse axis.

14. The valve system of claim 1 and further comprising a spring biased pin and a corresponding recess for receiving said pin located between said first locking member and the first port, wherein said pin engages said recess when said first locking member is in its first circumferential position, and wherein said pin and recess block inadvertent rotation of said first locking member out of its first circumferential position to maintain said first butterfly valve body locked in its closed position in said uncoupled mode.

15. The valve system of claim 1 wherein said first locking member includes a first locking surface, wherein in said first circumferential position of said locking member said first locking surface slides into engagement with a locking surface on said first butterfly valve body, wherein said first locking surface blocks rotation of said first butterfly valve body about said transverse axis, and wherein said first locking member has a second locking surface, wherein in said second circumferential position of said first locking member said second locking surface slides into engagement with a roller on the second container port, wherein movement of said first locking member from said second circumferential position to said first circumferential position to allow uncoupling of the first and second ports locks said first butterfly valve body into said closed position.

16. The valve system of claim 15 wherein said locking member comprises an annular ring and wherein said first locking surface is located on a locking tab projecting radially from said annular ring.

17. The valve system of claim 1 and further comprising a second locking member which is rotatable circumferentially with respect to the second port from a first circumferential position to a second circumferential position, wherein in said first circumferential position said second locking member locks said second butterfly valve body in said closed position, and wherein in said second circumferential position said second locking member unlocks said second butterfly valve body to allow pivoting of said second butterfly valve body to said open position.

18. The valve system of claim 17 wherein said second locking member in said second circumferential position further locks the first port and the second port together in said coupled mode.

19. The valve system of claim 17 wherein in said uncoupled mode said first butterfly valve body, said second butterfly valve body, said first locking member, and said second locking member are disassembleable apart from each other and apart from the first port and the second port;
   wherein said first butterfly valve body is interchangeable with said second butterfly valve body; and
   wherein said first locking member is interchangeable with said second locking member.

20. The valve system of claim 17 and further comprising a spring biased pin and a corresponding recess for receiving said pin located between said first locking member and the first port, wherein said pin engages said recess when said first locking member is in its first circumferential position, and wherein said pin and recess block inadvertent rotation of said first locking member out of its first circumferential position to maintain said first butterfly valve body locked in its closed position in said uncoupled mode;
   a second spring biased pin and a corresponding second recess for receiving said second pin located between said second locking member and the second port, wherein said second pin engages said second recess when said second locking member is in its first circumferential position, and wherein said second pin and second recess block inadvertent rotation of said second locking member out of its first circumferential position to maintain said second butterfly valve body locked in its closed position in said uncoupled mode;
   wherein the first port has a first mating pin projecting axially forward from the first port;
   wherein the second port has a second mating pin projecting axially forward from the second port;
   wherein in said coupled mode said first mating pin is inserted into said second recess between the second port and said second locking member and urges said second spring biased pin out of said second recess to allow circumferential rotation of said second locking member; and,
   wherein in said coupled mode said second mating pin is further inserted into said recess between the first port and said first locking member and urges said spring biased pin out of said recess to allow circumferential rotation of said first locking member.

21. The valve system of claim 1 wherein said first locking member includes a first radially projecting stop tab and a second radially projecting stop tab to limit circumferential rotation of said first locking member.

22. A valve system, comprising:
   a first container port and a second container port which are uncoupleable and coupleable with respect to each other between an uncoupled mode and a coupled mode respectively;
   a first butterfly valve body pivotable about an axis which is oriented transverse to the first port and the second port, wherein said first butterfly valve body in a closed position seals the first port against flow of material therethrough;
   a second butterfly valve body pivotable about said transverse axis, wherein said second butterfly valve body in a closed position seals the second port against flow of material therethrough, wherein in said coupled mode said first and second butterfly valve bodies are immediately adjacent each other and are simultaneously pivotable about said transverse axis to an open position to allow flow of material through the first and second ports;
   a first locking member external of said first and second container ports and moveable to lock and unlock said first butterfly valve body to respectively prevent and allow pivoting of said butterfly valve bodies from said closed positions to said open position;
   a second locking member external of said first and second container ports and movable to lock and unlock said second butterfly valve body to respectively prevent and allow pivoting of said butterfly valve bodies from said closed positions to said open position;
   wherein in said uncoupled mode said first butterfly valve body, said second butterfly valve body, said first locking member, and said second locking member are disassembleable apart from each other and apart from the first port and the second port;
   wherein said first butterfly valve body is interchangeable with said second butterfly valve body; and
   wherein said first locking member is interchangeable with said second locking member.

23. The valve system of claim 22 wherein in said second circumferential position said first locking member allows selective pivoting of said first and second butterfly valve bodies between said closed position and said open position, wherein said butterfly valve bodies are pivotable in excess of 360° about said transverse axis.

* * * * *

UNITED STATES PATENT AND TRADEMARK OFFICE
CERTIFICATE OF CORRECTION

PATENT NO. : 5,150,735

DATED : September 29, 1992

INVENTOR(S) : Michael J. Bandy, Roy H. Byerly and Robert T. Spoonmore

It is certified that error appears in the above-identified patent and that said Letters Patent is hereby corrected as shown below:

In Column 7, at Line 40, "is" should read --in--.

Signed and Sealed this

Nineteenth Day of October, 1993

Attest:

BRUCE LEHMAN

*Attesting Officer*  *Commissioner of Patents and Trademarks*